Dec. 8, 1942.   C. E. GREGORY   2,304,636
AUTOMATIC TRANSMISSION
Filed Nov. 2, 1940   3 Sheets-Sheet 1

Inventor
CHARLES E. GREGORY.
by Charles Dobbn Attys

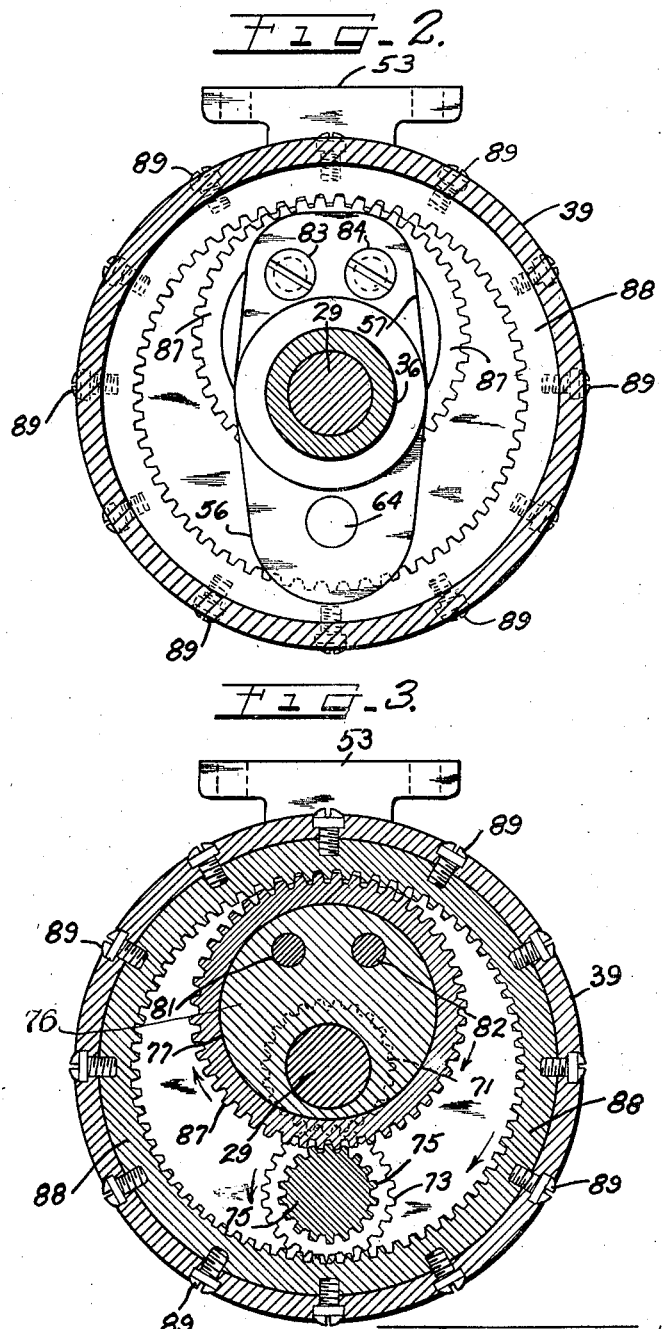

Dec. 8, 1942. C. E. GREGORY 2,304,636
AUTOMATIC TRANSMISSION
Filed Nov. 2, 1940 3 Sheets-Sheet 3
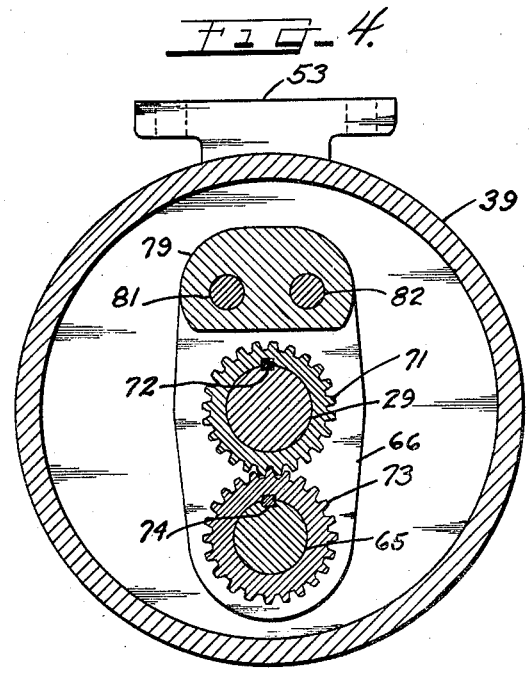
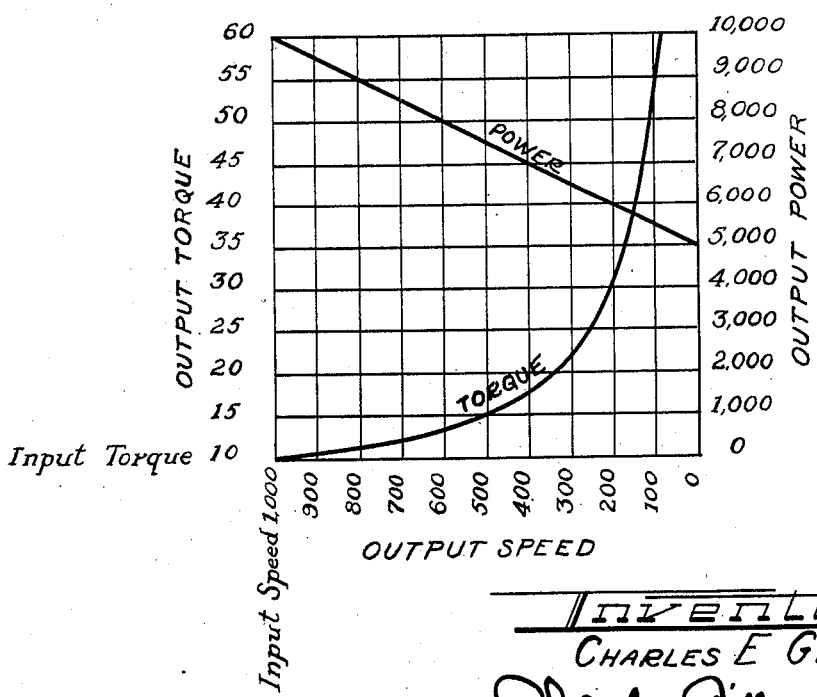
Inventor
CHARLES E GREGORY.
by
Attys Patented Dec. 8, 1942

2,304,636

UNITED STATES PATENT OFFICE 2,304,636

AUTOMATIC TRANSMISSION

Charles E. Gregory, Chicago, Ill., assignor to The Trust Company of Chicago, as trustee Application November 2, 1940, Serial No. 364,012

8 Claims. (Cl. 74—259)

This invention relates to an automatic transmission for transmitting power at variable ratios and more particularly to a torque-sensitive transmission having an infinitely variable change of gear ratios which change gradually in response entirely to the difference in torque, rather than in speed, between its driving end and its driven end.

Generally, the present invention provides a torque-sensitive mechanism in combination with a fluid clutch or other similar mechanism, for transmitting power from a prime mover or driving unit to a driven unit. The torque from the driving unit passes directly through the driving portion of the clutch to a central or sun gear in the transmission by means of a main shaft and then through a gear train, including a countershaft and an idler gear, which meshes with a ring gear for driving the driven unit. The gear train is similar to a planetary gear in that any torque supplied through these gears will cause the entire planetary train to revolve about the main shaft in a direction opposite to the rotation of the main shaft. During initial movement of a load, the idler gear and the gear train are caused to revolve in a reverse direction to that of the driven ring gear due to a "kick-back" effect in overcoming inertia of the driven ring gear. When this starting inertia is overcome and the driven ring gear attains a steady speed, the idler gear gradually comes to rest and then commences to turn in the same direction as the driven ring gear. As soon as the driven ring gear and the idler gear turn in the same direction and at the same speed, then the transmission transmits torque at a direct ratio. At this moment, the gear train turns en masse together with the driving shaft without any rotation about their own centers. Until direct drive is reached, the gears of the train rotate about their own centers and revolve about the driving shaft. From the moment of initial rotation until the gears turn in the same direction and at the same speed there is a gradual change in transmission ratio. Initial rotation defines the highest reduction in the transmission of torque while co-rotation of the gears defines the lowest reduction or direct drive.

It is important to note that during initial movement of the main shaft the planetary gear train revolves about the main shaft in a reverse direction thereto although the individual gears of the train rotate about their own centers either in the same or in the opposite direction to the main shaft depending on their meshed relation. Consequently, the greatest reduction in the transmission of torque occurs when the load is the heaviest or during initial movement of a load or when loads are induced on the transmission through the driven end thereof.

It is, therefore, an object of the present invention to provide an automatic transmission wherein the gear ratios change gradually without steps, throughout a wide range in response solely to load conditions.

Another object of this invention is to provide an automatic transmission and clutch which operates at a higher efficiency, with greater economy, lending itself to a more rugged construction, and subsequently operates with less destructive wear than the conventional manually controlled transmission.

A further object of this invention is the provision of a gear coupling mechanism for transmitting power between a driving shaft and a driven shaft at gradual and automaic changes in ratios throughout a wide range in response to torque differential at the ends of the coupling mechanism.

Another and still further object of this invention is the provision of a torque-sensitive transmission through which a portion of the transmitted torque is amplified.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 2 is a transverse vertical cross-sectional view, with parts in elevation, taken substantially in the plane indicated by the line II—II of Figure 1 and looking in the direction of the arrows;

Figure 3 is a view similar to Figure 2 taken substantially in the plane indicated by the line III—III of Figure 1;

Figure 4 is a view similar to Figure 2 taken substantially in the plane indicated by the line IV—IV of Figure 1; and, Figure 5 is a performance chart indicating the operating characteristics of the device illustrated in Figure 1.

Figure 1:
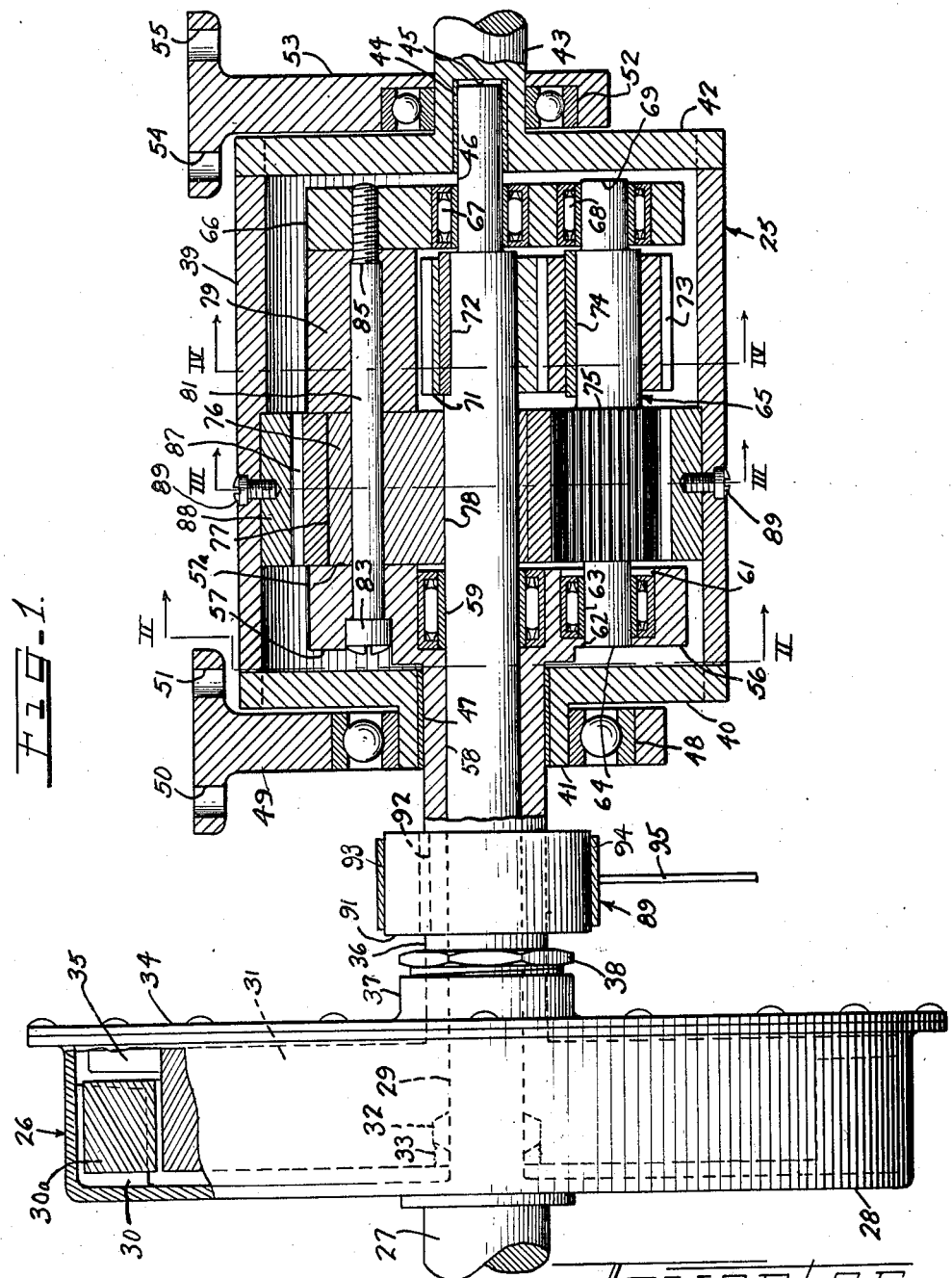
Figure 1 is a view, partially in elevation and partially broken away in vertical cross-section, of a power transmission device embodying the principles of the present invention.

As best shown in Figure 1, the automatic transmission device 25 of this invention is illustrated as being coupled to a driving clutch unit 26 or other similar device.

In order that the automatic transmission 25 operate at any number of intermediate gear ratios, it is necessary that the torque supplied by a driving unit, such as an engine (not shown), through a driving shaft 27 be passed through a unit having a driving portion and a driven portion which portions are not positively connected together. For this purpose, a clutch 26 of the hydraulic, mercury, electric drive type, or any other similar mechanism having similar transmitting characteristics, is used. For the purpose of illustration only, the clutch 26 is of the mercury type in which the casing 28 is directly connected to the shaft 27 and the drive shaft 29, which extends through the transmission 25, is also connected to the casing. A series of integral vanes 30 extend inwardly from the inner periphery of the casing 28 with a floating shoe 30a being inserted between adjacent vanes. A drum 31 rotatably embraces the main shaft 29 with its periphery being spaced inwardly from and adjacent the inner edges of the vanes 30. The hub of the drum 31 is suitably enlarged for the purpose of receiving packing 32 which is retained between the drum and the main shaft 29 by a packing nut 33. This prevents the fluid or liquid medium, such as mercury, from seeping along the main shaft 29 to the exterior of the clutch.

The casing 28 is closed by a face plate 34. In the recess between the face plate 34 and the side edges of the vanes 30, there is inserted a plurality of vanes 35 fixed to the drum 31.

As the casing 28 rotates, the shoes 30a between the vanes 30 are displaced inwardly toward the rotating axis of the clutch by the heavy mercury contained therein being thrown outwardly against the inner periphery of the casing. This displacement provides a fluid lock between the vanes 30 and 35 whereby the driving and driven portions of the clutch rotate together. However, until the inertia of the driven portion of the clutch is overcome the latter will lag in its rotation behind that of the positively driven portion of the clutch.

It is believed that a further description of the clutch is unnecessary as it forms no part of the present invention.

A rotatable sleeve 36 embraces the main shaft 29 and is connected to the clutch drum 31. Suitable packing (not shown) is provided around the sleeve 36 and within the boss 37 on the clutch face plate 34. A nut 38 is threaded into the boss 37 for retaining the packing against the sleeve 36 to provide a fluid-tight bearing.

The transmission 25 comprises a cylindrical casing 39 having at one end a face plate 40 with a bearing hub 41 and at its other end a face plate 42 with a hollow bearing shaft 43. A sleeve 44 of suitable bearing material is mounted in the bore 45 of the bearing shaft 43 and receives therein the reduced end 46 of the main shaft 29. Similarly, a sleeve 47 in the hub 41 of the face plate 40 receives therethrough the rotatable sleeve 36 which embraces a portion of the main shaft 29.

An anti-friction bearing 48 embraces the periphery of the bearing hub 41 and is carried by a support bracket 49 having apertures 50 and 51 by which the bracket is connected through bolts to a stationary support. Likewise, an anti-friction bearing 52 embraces the periphery of the bearing shaft 43 and is carried by a supporting bracket 53 having apertures 54 and 55 through which it is connected to a stationary support by means of bolts or the like. This arrangement of supports at the ends of the casing 39 permits the casing to rotate freely relative thereto.

The inner end of the rotatable sleeve 36 terminates within the casing 39 adjacent the face plate 40 and extends outwardly in a radial direction to provide a pair of flanges 56 and 57, as best shown in Figures 1 and 2.

The inner bore 58 of the sleeve 36 is suitably enlarged at its flanged portions for receiving therein an anti-friction bearing 59 whose inner race embraces the main shaft 29 and whose outer race seats within the enlarged bore.

The flange 56 is provided with an enlarged bore 61 and a coaxial reduced bore 62. An anti-friction bearing 63 has its outer race inserted in the enlarged bore 61 with its inner race embracing one end 64 of a countershaft 65 which extends through the bore 62.

A yoke 66 is provided with a central bore for receiving therein the outer race of an anti-friction bearing 67 and whose inner race embraces a portion of the reduced end 46 of the main shaft 29. A similar bore is provided in the yoke 66 adjacent the central bore and in coaxial alignment with the anti-friction bearing 63 in the flange 56 for receiving therein an anti-friction bearing 68 within which is journalled the reduced end 69 of the countershaft 65.

A main drive gear 71 is connected to the main shaft 29 adjacent its reduced end 46 by means of a key 72. A driven gear 73, in aligned meshed engagement with the driving gear 71, is connected to the countershaft 65 adjacent its reduced end 69 by means of a key 74. An integral pinion 75 is provided on the countershaft 65 between its end 64 and the keyed position of the driven gear 73.

A bearing disk 76 (Figures 1 and 3) is provided with a smooth peripheral bearing surface 77 and an eccentric bore 78 therethrough for receiving the main shaft 29. It is to be noted that the width of the disk 76 is co-extensive with that of the pinion 75 and is positioned to abut against the inwardly extended face 57a of the flange 57 but spaced from the flange 56. A counterweight member 79, offsetting the diammetrically opposed weight of the driven gear 73, is inserted between the yoke 66 and the bearing disk 76. As best shown in Figures 1 and 2, a pair of laterally spaced studs 81 and 82 are passed through aligned openings to connect the flange 57, the bearing disk 76, the counterweight 79 and the yoke 66. Slotted heads 83 and 84 of the studs 81 and 82 are seated within the flange 57. The opposite ends of the studs are threaded, as shown at 85 in Figure 1, to engage threads within the yoke 66 to draw the members into tight connected engagement whereby they turn as a mass.

An exteriorly toothed ring gear 87 is rotatably journalled on the bearing disk 76 in meshed engagement with the pinion 75 and is retained against lateral movement by being seated between the flange 57 and the counterweight 79.

An internally toothed ring or idler gear 88, in aligned meshed engagement with the ring gear 87, is connected to the inner periphery of the cylindrical casing 39 by means of a plurality of short peripherally spaced studs 89.

It will be noted from the foregoing description that a direct drive is provided from the shaft 27 to the hollow bearing shaft 43 through the main shaft 29, the meshed gears 71 and 73, and the meshed gears 75, 87 and 88. This positive drive between the shaft 27 and the bearing shaft 43 has a reduction dependent upon the size of the gears used within the transmission 25. The torque transmitted from the shaft 27 to the bearing shaft 43 is thereby amplified depending upon the gear ratio of the transmission.

Since the flange 57, the bearing disk 76, the counterweight 79 and the yoke 66 are connected by the studs 81 and 82, the entire mechanism within the transmission consisting of the connected elements together with the countershaft 65, the driven gear 73 and the idler or ring gear 87 form a planetary mechanism which may revolve around the central or sun gear 71. This planetary mechanism, due to the starting inertia of the driven ring gear 88 and the casing 39, revolves in a reverse direction relative to the rotation of the main shaft 29 upon initial movement thereof. In order that this reverse movement of the planetary mechanism be eliminated, a holding device 89 is provided between the forward end of the transmission and the driving clutch. The holding device illustrated in Figure 1 comprises a brake drum 91 secured to the rotatable sleeve 36 by means of a key 92. Suitable brake shoes 93 and 94 engage the brake drum 91 to hold the rotatable sleeve 36 in a stationary position. For the purpose of illustration, an actuating rod 95 is shown by which the shoes 93 and 94 are actuated toward and away from the drum 91 by any of the well known conventional linkages. The rod 95 may be arranged for manual or other actuation by the operator of the vehicle. During initial movement of the vehicle, the load on the engine is heavy and the atmospheric pressure in the intake manifold, usually referred to as vacuum, is low. By suitable connections the shoes 93 and 94 engage the drum 91 to hold the sleeve 36 in a stationary position when this vacuum is low. As the torque builds up and passes through the clutch 26 to overcome the action of the planetary mechanism to revolve in a reverse direction, the load on the engine is gradually decreased and the brake is correspondingly released to permit rotation of the sleeve 36. As the torque further increases, the driven member 31 of the clutch 26 commences to turn in the same direction as the casing 28. During this lagging movement of the clutch drum 31 relative to the rotation of the clutch vanes 30, the gears of the planetary train rotate on their own centers, with the train revolving in a reverse direction to that of the rotation of the main shaft 29. As the load comes up to engine speed this lag is gradually decreased.

Consequently, as soon as the driven and driving portions of the clutch move in co-relation, then the planetary gear mechanism swings en masse about the central or sun gear with no rotation of the individual planet gears about their own centers. At this point, power is transmitted through the transmission at no reduction or is direct drive.

It will be apparent from the foregoing description that the fluid or electric type clutch with which the transmission of this invention is used will constantly drive the main shaft 29 at engine speed while the sleeve 36 will be driven through the clutch medium, (fluid or electric current) in direct relation to the rotation of the clutch drum 31. When the shaft 29 and sleeve 36 are turned at different rates due to slippage through the clutch medium the planetary gear mechanisms will be rotated within the casing 39 around their own centers. This rotation of the gear mechanism increases the torque output to the casing. Now as the slippage through the clutch medium decreases, the sleeve 36 and shaft 29 approach the same speed thereby decreasing the torque output to the casing. Then as soon as the sleeve 36 and shaft 29 rotate together at the same speed direct drive through the casing will occur and the planetary gears will cease to rotate about their own centers and will only rotate with the casing and shaft.

As a result gear reduction will occur from direct drive to the point of maximum slippage of the clutch or maximum difference in speeds of the shaft 29 and sleeve 36 and the change from this maximum to direct drive will be unbroken.

It is to be understood, however, that although the preferred form of holding device is illustrated and described as being a brake, the mechanism will work equally as well if a roller clutch is substituted which will permit the sleeve 36 to rotate freely in one direction and to retain it against rotation in the opposite direction. A roller clutch of the type described, would provide an automatic holding means thereby eliminating the need of manual actuation.

Figure 5 illustrates a performance chart of the operating characteristics of the automatic transmission of this invention taken at an input torque of 10 pound-feet and an input speed of 1,000 R. P. M. At any other input torque or speed, the chart readings must be corrected by performance factors of speed and torque in a manner as set forth by way of example to follow. The input torque shown at the lower left-hand corner of the chart is given the base 10 and the output is corrected by a factor in multiples of 10 of the actual input torque. Likewise, the input speed, with a base of 1,000 R. P. M. shown at the lower left-hand corner, is corrected by the same factor. This corrected speed divided by the transmission gear ratio gives the output speed. The co-ordinate of the corrected output speed is the uncorrected output power which is corrected by the product of the factors of speed and torque.

By way of example, if the input torque is 50 pound-feet and the ratio of the transmission is taken as 4:1 then the output speed will be one-fourth that of the input speed. Assuming that the input speed is 2,000 R. P. M. the output speed would be 500 R. P. M. Correcting the output speed by the speed factor of 2 which is obtained by dividing the actual speed of 2,000 R. P. M. by the base speed of 1,000 R. P. M. on the chart, the speed is shown as 250 R. P. M. on the chart. The co-ordinate of an output speed of 250 R. P. M. gives an output torque reading in the chart of 25 pound-feet. As the input torque is in multiples of ten the output torque must accordingly be revised by the input torque factor, which in this case is 5 and is obtained by dividing the actual input torque of 50 pound-feet by the base input torque of 10 on the chart. The output torque of 25 pound-feet multiplied by the multiple factor 5 gives the true output torque as 125 pound-feet. Likewise, the co-ordinate at 250 R. P. M. shows an output power of approximately 6,250 foot pounds. This figure must also be corrected by the torque factor 5 and the speed factor of 2 and the true reading therefore is 6,250×5×2 or 62,500 foot pounds. The product of the input torque and speed divided by the factor 550 will give the input horse power. Similarly, the output power divided by the factor 550 will give the output horse power. From the chart illustrated, the output torque, the output power and the output horse power can easily and quickly be determined.

From the foregoing description, it will be apparent that a mechanism has been provided herein which automatically transmits the torque required at the driving end thereof through gradually varying gear ratios under the influence solely of load conditions.

While a particular embodiment only of this invention has been illustrated, it will, of course, be understood that the invention should not be limited thereto, since many modifications may be made and, therefore, it is contemplated by the appended claims to cover all such modifications as fall within the true spirit and scope of the present invention.

I claim as my invention:

1. A transmission mechanism comprising a main shaft, a countershaft in spaced parallel relation to said main shaft, spaced yokes having said shafts journalled therein, meshed gears between said yokes for connecting said shafts, an eccentric bearing disk mounted on said main shaft between one of said yokes and said meshed gears, means for connecting together said yokes and said bearing disk, an externally toothed ring gear rotatably supported by said bearing disk, an internally toothed ring gear mounted in concentric spaced relation from said main shaft for meshing engagement with said externally toothed ring gear, and a pinion on said countershaft for engaging said externally toothed ring gear.

2. A transmission mechanism comprising a main shaft, a countershaft, a sleeve rotatably embracing said main shaft and having a yoke on an end thereof, another yoke spaced from said first yoke, said yokes having said shafts journalled therein, an eccentric bearing rotatably mounted on said main shaft, and means for connecting together said yokes and eccentric bearing whereby said countershaft is revolved about the axis of said main shaft when said sleeve rotates.

3. A transmission mechanism comprising a driving shaft, a second shaft driven by said driving shaft, meshed gears connecting said shafts for rotation about their own axes, means journalled on said shafts connecting them for revolution of one shaft around the axis of the other shaft, a pinion on said second shaft, an idler gear meshing with said pinion, a bearing on said driving shaft for supporting said idler gear for rotational movement about an axis spaced from the rotational axis of said driving shaft, and means for controlling the rotation and revolutoin of said shafts.

4. A transmission mechanism comprising a casing mounted for rotation and having a driving hub at one end, a main shaft coaxially mounted for free rotation within said casing, a rotatable sleeve between said casing and said shaft, a flange on said sleeve within the casing, a yoke journalled on said main shaft in spaced relation from said flange, a countershaft having its ends journalled respectively in said flange and said yoke, meshed gears connecting said shafts, a bearing between said flange and yoke and journalled on and having the rotational axis of its periphery spaced from the axis of said main shaft, an externally toothed ring gear rotatably mounted on said bearing, a pinion on said countershaft engaging said externally toothed ring gear, an internally toothed ring gear on the inside of said casing engaged by said externally toothed ring gear, and means connecting said flange, bearing and yoke whereby said countershaft may be revolved about the axis of the main shaft in the same or in an opposite direction to the rotation of said main shaft.

5. In a transmission including a torque-sensitive clutch having driving and driven members, the improvement of a torque-sensitive gear reduction mechanism comprising a drive shaft directly driven from the driving member of the clutch, a driving gear secured on said shaft, a countershaft mounted for orbital movement around said shaft, a gear on said countershaft meshed with the driving gear on said driving shaft to rotate the countershaft about its own axis, a pinion on the countershaft, an eccentric bearing loosely mounted on the drive shaft, an externally toothed ring gear loosely mounted on said bearing, a sleeve driven by the driven portion of the clutch for driving the countershaft and externally toothed ring gear orbitally around the drive shaft, a driving casing rotatable around the sleeve and housing the shafts, gears, pinion and bearing, an internally toothed ring gear secured in the housing in toothed engagement with the externally toothed ring gear whereby gear reduction is obtained in direct proportion to the relative speeds of the drive shaft and sleeve as controlled by the torque-sensitive clutch.

6. A transmission mechanism comprising a shaft, a second shaft, meshed gears connecting said shafts for rotation about their own axes, yoke means connecting said shafts, eccentric bearing means rotatably mounted on one of said shafts, and means connecting said yoke means and eccentric bearing means whereby one of said shafts is revolved around the axis of the other shaft.

7. In a transmission including a clutch having a driving member and a driven member, the improvement of a torque-sensitive gear reduction mechanism comprising a shaft driven by the driving member of said clutch, a second shaft, connecting means for transmitting rotation of said first shaft to said second shaft, means independent of said connecting means for rotatably mounting said shafts in spaced relation, and means driven by the driven member of said clutch for revolving one of said shafts around the axis of the other shaft.

8. A transmission mechanism comprising a rotatably mounted housing, a driven shaft connected to said housing for rotation therewith, a drive shaft extending into said housing, a countershaft within said housing, means within said housing journaled on said drive shaft and mounting said countershaft parallel therewith whereby said countershaft may revolve about the axis of said drive shaft, means independent of said first mentioned means connecting said drive shaft and countershaft for co-rotation about their own axes, and means mounted on said drive shaft for connecting said countershaft and said housing for rotation of said housing by said countershaft.

CHARLES E. GREGORY.